US009866539B2

United States Patent
Levchenko et al.

(10) Patent No.: US 9,866,539 B2
(45) Date of Patent: Jan. 9, 2018

(54) SYSTEM AND METHOD FOR PROTECTING TRANSMISSION OF AUDIO DATA FROM MICROPHONE TO APPLICATION PROCESSES

(71) Applicant: AO Kaspersky Lab, Moscow (RU)

(72) Inventors: Vyacheslav I. Levchenko, Moscow (RU); Alexander V. Kalinin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 15/201,887

(22) Filed: Jul. 5, 2016

(65) Prior Publication Data

US 2017/0310648 A1  Oct. 26, 2017

(30) Foreign Application Priority Data

Apr. 25, 2016  (RU) .................. 2016116002

(51) Int. Cl.
  *H04L 29/06* (2006.01)
  *G06F 21/62* (2013.01)
  *G06F 21/60* (2013.01)

(52) U.S. Cl.
  CPC ...... *H04L 63/0464* (2013.01); *G06F 21/6218* (2013.01); *G06F 21/60* (2013.01); *G06F 21/62* (2013.01); *G06F 21/6209* (2013.01); *G06F 2221/2141* (2013.01); *H04L 63/0428* (2013.01)

(58) Field of Classification Search
  CPC ...... G06F 21/60; G06F 21/604; G06F 21/606; G06F 21/62; G06F 21/6209; G06F 21/6218; G06F 21/6281; G06F 2221/2141; H04L 63/0464; H04L 63/0428
  See application file for complete search history.

(56) References Cited

U.S. PATENT DOCUMENTS

| | | | | |
|---|---|---|---|---|
| 5,893,926 A | * | 4/1999 | Saxena | G06F 13/102 710/56 |
| 6,766,458 B1 | * | 7/2004 | Harris | G06F 21/577 709/206 |
| 8,463,612 B1 | | 6/2013 | Neath et al. | |

(Continued)

FOREIGN PATENT DOCUMENTS

EP  2573702 A2  3/2013

OTHER PUBLICATIONS

European Search Report and Written Opinion for EP 16 18 1134 dated Sep. 30, 2016.

*Primary Examiner* — Robert Leung
*Assistant Examiner* — Ayoub Alata
(74) *Attorney, Agent, or Firm* — Arent Fox LLP; Michael Fainberg (57) ABSTRACT

Disclosed are systems and methods for protecting transmission of audio data from microphone to application process. An exemplary method includes receiving a request from a software process to obtain an audio stream from an audio endpoint device; allocating a data buffer for the software process; processing and encrypting audio data received from the audio endpoint device by audio processing objects; storing the encrypted audio data in the allocated data buffer; installing an interceptor of a API function call for the software process; and decrypting the encrypted audio data from the allocated data buffer by the software process using the interceptor of the API function call.

21 Claims, 7 Drawing Sheets

(56) References Cited

U.S. PATENT DOCUMENTS

| | | | |
|---|---|---|---|
| 2004/0186601 A1* | 9/2004 | Swenson | G06F 9/485 700/94 |
| 2005/0198061 A1 | 9/2005 | Robinson et al. | |
| 2013/0081103 A1* | 3/2013 | Uner | G06F 21/577 726/1 |
| 2014/0068704 A1 | 3/2014 | Grewal et al. | |
| 2015/0046706 A1* | 2/2015 | Makarov | G06F 21/6218 713/165 |

* cited by examiner

SYSTEM AND METHOD FOR PROTECTING TRANSMISSION OF AUDIO DATA FROM MICROPHONE TO APPLICATION PROCESSES

CROSS-REFERENCE TO RELATED APPLICATIONS

This application claims benefit of priority under 35 U.S.C. 119(a)-(d) to a Russian Application No. 2016116002 filed on Apr. 25, 2016, which is incorporated by reference herein.

FIELD OF TECHNOLOGY

The disclosure herein generally relates to the protection against loss of data, and more particularly, to systems and methods of protecting transmission of audio data from microphone to application process.

BACKGROUND

In the modern world, users encounter many cyber threats, one of which is unauthorized access to the user's microphone for the purpose of eavesdropping. In order to realize a control of access to the microphone data on the part of processes running on the user's computer it is necessary to perform a filtration of certain requests within the operating system or obtain access to the context of the request data for identification of the processes requesting access, in order to block those processes for which access has not been authorized. In the Windows XP and older operating systems, this functionality has been resolved by intercepting traffic in the region of the "KSmixer.sys" kernel component (the Windows Kernel Streaming technology). Requests to read microphone data in the framework of the traffic being intercepted have gone through a special filter in the context of the process reading the microphone data.

With the advent of Windows Vista, a new architecture WASAPI was developed, consisting of many kernel components and a user mode where the Windows Kernel Streaming technology has remained in the "basic variant", while all of the audio traffic has been put through private COM interfaces of new audio drivers, which are registered on the port driver "portcls.sys". These audio drivers can be realized such that the audio traffic with the help of a Direct Access Memory (DMA) controller ends up at once in the user mode buffer, that is, without the involvement of the processor or any supplemental code. And this buffer is mapped into a protected process "audiodg.exe", from which the data is copied by the processor into the buffer of the user process in the context of this same process "audiodg.exe". That is, the controlling filter in the Windows Kernel Streaming technology has become absolutely unsuitable, starting with Windows Vista.

Due to the foregoing, the need arises for a method which is able to intercept audio traffic from microphones linked to the context of the processes reading the data from the microphones in order to protect transmission of audio data.

SUMMARY

Disclosed are systems, methods and computer program products for preventing unauthorized access to audio data by protecting transmission of audio data from a microphone to application processes on a computer.

According to one exemplary aspect, a method is provided for preventing unauthorized access to audio data. According to this aspect, the method includes receiving, by a processor of the computer, a request from one software process of a plurality of software processes to obtain an audio stream from an audio endpoint device; allocating, by the processor, a data buffer of a plurality of data buffers for the one software process; processing and encrypting audio data received from the audio endpoint device by at least one audio processing object, wherein the audio data associated with the requested audio stream; storing, by the processor, the encrypted audio data in the allocated data buffer; installing an interceptor of a API function call for the one software process; and decrypting the encrypted audio data from the allocated data buffer by the one software process using the interceptor of the API function call.

According to another exemplary aspect, the method further includes receiving, by a processor of the computer, a plurality of requests from the plurality of software processes, respectively, to obtain audio streams from one or more audio endpoint devices including the audio endpoint device; allocating, by the processor, the plurality of data buffers for the plurality of software processes; encrypting audio data associated with each of the requested audio streams; storing the encrypted audio data for each of the requested audio streams in the allocated data buffer, respectively; and decrypting the encrypted audio data for each of the requested audio streams by at least a portion of the plurality of software processes that have been configured with a respective interceptor of a API function call.

According to another exemplary aspect, the method further includes determining, by the processor, process identifier data for the one software process; determining, by the processor, whether the one software process requesting to obtain the audio stream is an unauthorized software process based on the process identifier data; and installing the interceptor of the API function call for the one software process only if the processor determines that the one software process is not an unauthorized software process.

According to another exemplary aspect, the determining of whether the software process requesting to obtain the audio stream is an unauthorized software process comprises at least one of: monitoring activities of the requesting process to determine whether the process is trusted or not trusted; scanning the requesting process by accessing a database of signatures of known viruses and comparing a signature of the requesting process; and receiving, from a user, a command whether to grant access to the audio stream by the requesting process.

According to another exemplary aspect, the method further includes directly storing the audio data received from the audio endpoint device in a separate data buffer; and only granting access to the audio data by the one software process after the audio data has been encrypted and the process identifier data indicates the one software process is not an unauthorized software process.

According to another exemplary aspect, the method further includes the processing of the audio data device by the at least one audio processing object comprises processing the audio data by a global effects audio processing object allocated for the plurality of software processes and a local effects audio processing object associated with the one software process.

According to another exemplary aspect, the method further includes the encrypting of the audio data comprises encrypting the audio data by one of a symmetrical encryption algorithm and an asymmetrical encryption algorithm.

According to another exemplary aspect, a system is provided for preventing unauthorized access to audio data.

According to this aspect, the system includes a plurality of data buffer in an electronic memory; and a processor configured to: receive a request from one software process of a plurality of software processes to obtain an audio stream from an audio endpoint device; allocate a data buffer of the plurality of data buffers for the one software process; process and encrypt audio data received from the audio endpoint device by at least one audio processing object, wherein the audio data associated with the requested audio stream; store the encrypted audio data in the allocated data buffer; install an interceptor of a API function call for the one software process; and decrypt the encrypted audio data from the allocated data buffer by the one software process using the interceptor of the API function call.

According to another exemplary aspect, a non-transitory computer readable medium storing computer executable instructions is provided for preventing unauthorized access to audio data. According to this aspect, the instructions are provided for receiving a request from one software process of a plurality of software processes to obtain an audio stream from an audio endpoint device; allocating a data buffer of a plurality of data buffers for the one software process; processing and encrypting audio data received from the audio endpoint device by at least one audio processing object, wherein the audio data associated with the requested audio stream; storing the encrypted audio data in the allocated data buffer; installing an interceptor of a API function call for the one software process; and decrypting the encrypted audio data from the allocated data buffer by the one software process using the interceptor of the API function call.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for preventing unauthorized access to audio data by protecting transmission of audio data from microphone to application process. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
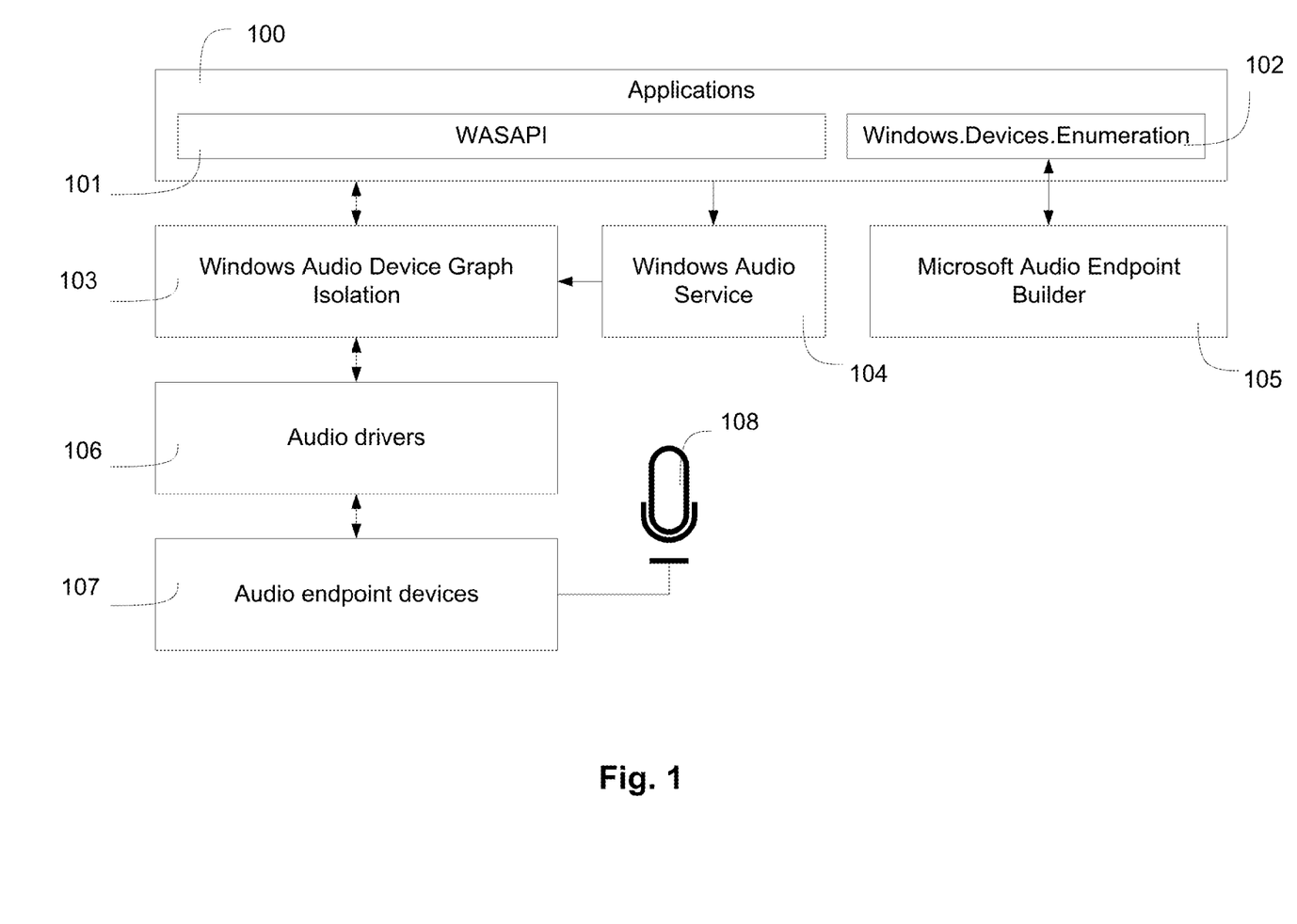
FIG. 1 illustrates a high-level model of Windows Audio Stack.

To increase the reliability and simplify the development of applications working with audio data, Microsoft has significantly redeveloped the audio stack, which is used in modern operating systems starting with Windows Vista. FIG. 1 shows a high-level model of the new audio stack. The basic components of this model are listed and described below. The list of components given in FIG. 1 is not exhaustive, but only includes those components which are used in the context of the present disclosure or are essential to an understanding of the principles of working with audio data in the context of the new audio stack model.

The Windows Audio Session API ("WASAPI" 101) are software interfaces allowing a control of the audio data streams between applications 100 and audio endpoint devices 107. For purposes of this disclosure, the term "audio endpoint device", "audio terminal device" or "audio endpoint" are used synonymously and can be considered a microphone, for example, according to one aspect. It should further be appreciated that the microphone may be embedded in the audio adapter that is connected to it, or it can be connected to a USB-adapter or connected to the device, which in turn is connected to the adapter.

In either case, each audio stream is part of an audio session, which is a combination of all audio streams between applications 100 and a specific audio endpoint device 107, such as a microphone 108. The Windows operating system makes it possible to process each stream separately within an audio session, and also control certain parameters, such as volume, within the entire audio session. It should be noted that an audio session may be composed solely of audio data rendering streams or audio data capture streams. In the context of the given disclosure, only audio data capture streams are considered. The applications 100 can use the WASAPI software interfaces in two modes: WASAPI Shared and WASAPI Exclusive. The use of the exclusive mode by one application blocks access to the audio endpoint device for all other applications. Use of the shared mode allows the applications 100 to obtain access to one and the same audio endpoint device 107 at the same time. The component Windows Audio Device Graph Isolation 103 is used to organize shared access to audio data arriving from one audio endpoint device 107.

Windows Audio Device Graph Isolation 103 is an audio stack component designed to transport audio data arriving from an audio endpoint device 107 to applications 100, and it makes it possible to perform various transformations of the data of audio streams during a single audio session, using only the resources of the central processor. For example, Windows Audio Device Graph Isolation 103 can put audio streams from different applications in the same form, indicated in the Windows settings, that is, the same number of channels, digitization frequency, and degree of quantization, or it can perform a mixing of audio streams, and in the case of an audio data capture stream it can copy it for transmission to several applications 100. Windows Audio Device Graph Isolation 103 is realized as a protected process "audiodg.exe", launched in user mode.

Windows Audio Service 104 is a service within the Windows operating system which is designed to create and control audio data streams. This audio stack component allows applications 100 to interact with the protected process "audiodg.exe", direct access to which is limited on their part. Windows Audio Service 104 is also a component which realizes the Windows Audio Policy, which includes a set of rules to be applied within the operating system to audio streams which are accessible in the shared mode within an audio session.

The audio drivers 106 are an interlayer within the audio stack model being described, including a combination of various system drivers maintaining the architecture of said audio stock, and also drivers allowing support of components of other manufacturers. For example, for audio adapters connected to the PCI and PCI express buses, system drivers of the "Port Class" (portcls.sys) are provided within the Windows operating system, including a group of port drivers to realize various audio adapter functions. And in the case of an audio adapter connected to a USB bus, system drivers of the "AVStream" class (Ks.sys) and a driver of the "USB Audio" class (Usbaudio.sys) are provided in the Windows operating system. The main characteristic of the new audio stack model realized within the interlayer of audio drivers 106 is the realization of the Microsoft Wave Real Time (WaveRT) technology, which allows the audio endpoint devices to record audio data without the involvement of the central processor directly into a buffer in user mode, from which the data is read by the protected process "audiodg.exe", realizing the Windows Audio Device Graph Isolation component 103. Access to this buffer from other processes is forbidden and controlled on the part of the operating system.

The audio endpoint devices 107 within the present disclosure are devices situated at one of the ends of the audio data transmission channel, which begins or ends at the application 100. Examples of audio endpoint devices include, but not limited to, a microphone 108, headphones, acoustic speakers or a CD player. The audio endpoint devices 107 can be connected to audio adapters or be a part of them.

The Microsoft Audio Endpoint Builder 105 is a service of the Windows operating system designed to detect new audio endpoint devices 107, and also keep track of and control the existing ones.

Windows.Devices.Enumeration 102 are software interfaces allowing applications 100 to interact with the Microsoft Audio Endpoint Builder service 105 to obtain information on the existing audio endpoint devices 107 and their use for rendering or capture of audio data.

Figure 2:
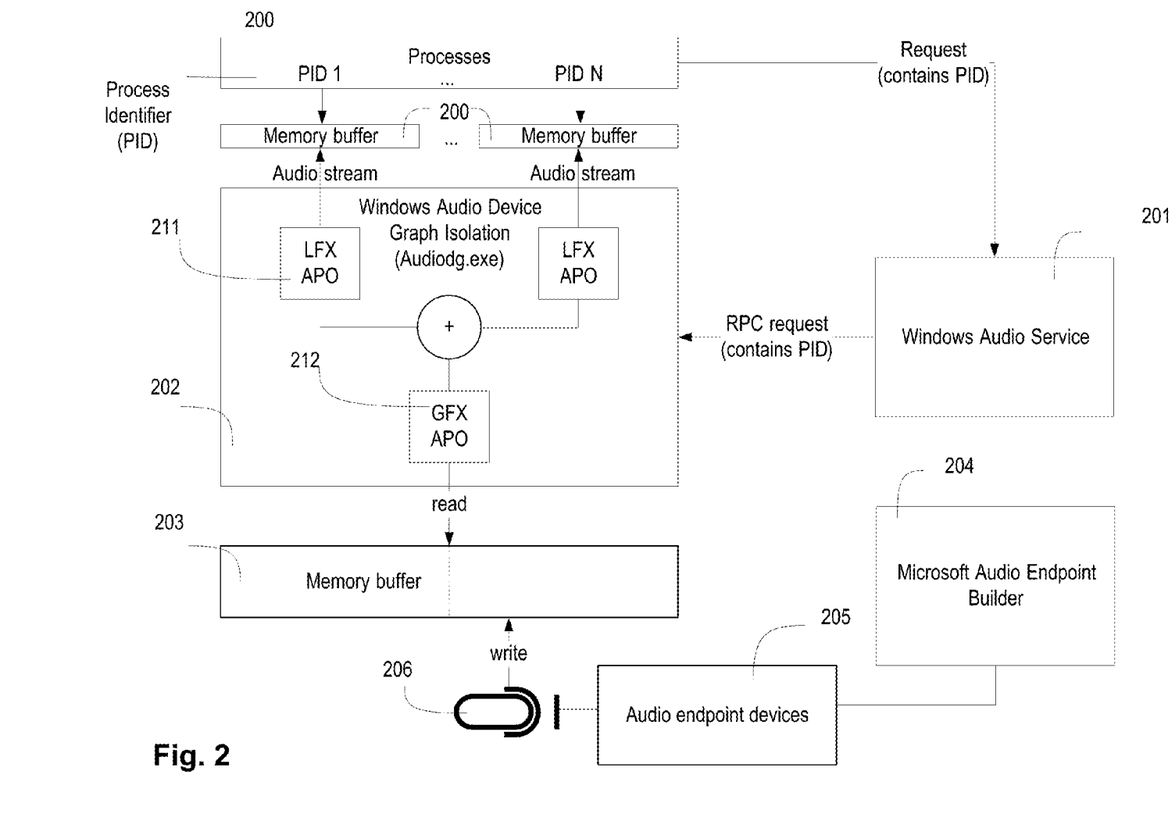
FIG. 2 illustrates a block diagram of an audio subsystem for preventing unauthorized access to audio data according to an exemplary aspect.

The disclosure now consider certain audio stack components that can be provided in the audio subsystem of the Windows operating system, within which the given invention is realized. Specifically, FIG. 2 illustrates a block diagram of an audio subsystem for preventing unauthorized access to audio data according to an exemplary aspect. As shown, this diagram describes a scenario in which processes 200 are provided access in shared mode (WASAPI Shared) within an audio session including audio data capture streams being received from an audio endpoint device, being the microphone 206. In the context of this diagram, the concept of processes 200 are considered by which is meant the applications being executed at the given moment. If an application is a passive set of instructions, a process is the immediate execution of these instructions. Each process has a unique identifier, the Process ID (in short, PID), by which the given process can be identified.

The main difficulty in the realization of the system and method of preventing unauthorized access to microphone data is the fact that all audio streams circulating between the processes and the audio endpoint device are the context of a single protected process "audiodg.exe" which realizes the Windows Audio Device Graph Isolation component 202. Since the process is protected, that is, the are access rights restrictions in regard to this process, interaction with this process by the use of standard API functions of the user mode is not possible when performing many operations. Thus, another process using standard API functions of the user mode cannot request information about the internal data of the process "audiodg.exe". For the interaction of each of the processes 200 with the protected process "audiodg.exe" realizing the Windows Audio Device Graph Isolation component 202, the Windows Audio Service 201 of the operating system creates a special cross-process buffer 200, through which audio data is transmitted from one of the audio endpoint devices 205, such as the microphone 206. As mentioned above, keeping track and adding of audio endpoint devices 205 is done with the help of the Windows Microsoft Audio Endpoint Builder service 204 of the operating system.

The interaction of the audio endpoint device, such as the microphone 206, with the protected process audiodg.exe 202 also occurs through a special buffer 203, accessible in user mode. The audio data goes to the buffer 203 directly from the microphone 206 without involvement of the central processor, and then is read by the Windows Audio Device Graph Isolation component 202, and vice versa, it is processed only with the use of resources of the central processor, that is, by software, without the involvement of the resources of the audio adapters to which the audio endpoint devices 205 are connected or of which they form a part.

Before the audio data which has been read from the buffer 203 will be transmitted to the processes 200, it is subjected to processing by the Windows Audio Device Graph Isolation component 202. The main tasks of the Windows Audio Device Graph Isolation component 202 are the transport of audio data arriving from an audio endpoint device, the microphone 206, to the processes 100, and the performance of various transformations of the data of the audio streams in the course of a single audio session. The transformations of the data of the audio streams are done with the help of miniport drivers of the aforementioned WaveRT technology, which are known as Audio Processing Objects (APO). One distinguishes two types of audio processing objects: global effects, abbreviated GFX APO 212, and local effects, abbreviated LFX APO 211.

According to one aspect, the audio engine configures the system-supplied APOs and sAPOs into components called pipes. There are two types of pipes in the audio engine: stream pipes are made up of APOs and sAPOs that perform digital audio processing that is local to the stream from a single application. The sAPO in this type of pipe is referred to as local effects sAPO (LFX sAPO). Device pipes are made up of APOs and sAPOs that perform digital audio processing that affects all the streams globally. The sAPO in this type of pipe is called a global effects sAPO (GFX sAPO).

In the context of an audio session, including audio data capture streams, global effects audio processing objects GFX APO 112 are used for the incoming audio stream received from the microphone 206. Then, for each process 200 having requested the creation of an audio stream from the Windows Audio Service 201, the creation of an independent audio stream is done by the Windows Audio Device Graph Isolation component 202 by copying of the incoming stream processed with the aid of the global effects audio processing object GFX APO 112. Each independent audio stream corresponds to a single process and is processed with the aid of local effects audio processing objects LFX APO 211. The number of local effects audio processing objects LFX APO 211 used for each independent audio stream can be the same or different. The nature of the manipulations performed with the data of each independent audio stream with the help of the local effects audio processing objects LFX APO 211 also may differ, since the parameters of the audio data processing objects can be controlled in real time. The local effects audio processing objects LFX APO 211 can be activated individually for each process, which will result in the adding of the local effects audio processing object LFX APO 211 to the audio stream corresponding to the given process. The local effects audio processing objects LFX APO 211 can also be deactivated individually for each process, which will result in the removal of the local effects audio processing object LFX APO 211 from the audio stream corresponding to the given process. The local effects audio processing objects LFX APO 211 are realized in the form of WaveRT miniport drivers, which are installed in the operating system and registered in relation to each specific audio endpoint device 205 by adding the corresponding records to the system registry, after which the local effects audio processing objects LFX APO 211 will be automatically installed by the audio subsystem for the processing of each new audio stream related to an audio endpoint device for which the given local effects audio processing objects LFX APO 211 have been registered.

In order for a process in the shared access mode (WASAPI Shared) to receive access to the audio data arriving from the microphone 206, it formulates and sends a request to the Windows Audio Service 201. This request includes various parameters, including the process identifier (PID). The Windows Audio Service 201 formulates and sends an RPC request for the creation of a new data stream to the Windows Audio Device Graph Isolation component 202, transmitting among the parameters of this RPC request the process identifier (PID) which requested the creation of the audio stream. The Windows Audio Service 201 creates a special cross-process buffer 200, by which audio data is transmitted from the microphone 206 to the process having requested the creation of the audio stream. The Windows Audio Device Graph Isolation 202 in turn creates an independent audio stream, related to the aforementioned special buffer 200, through which audio data will be transmitted to the process having requested the creation of the given audio stream. And, finally, the audio subsystem installs the local effects audio processing objects LFX APO 211, registered for the microphone 206, for the processing of the created audio stream.

Figure 3:
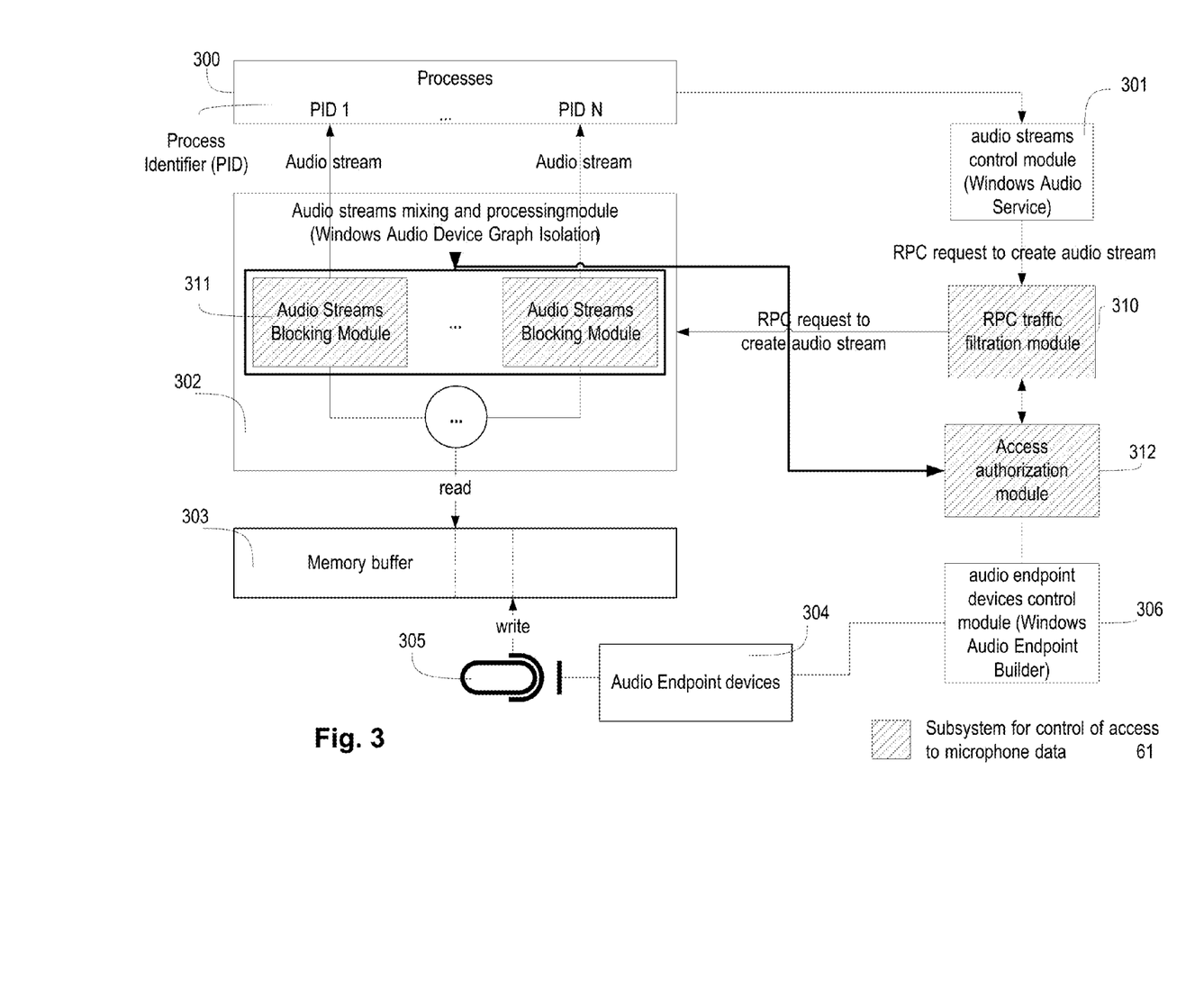
FIG. 3 illustrates another block diagram of an audio subsystem for preventing unauthorized access to audio data according to an exemplary aspect.

FIG. 3 illustrates another block diagram of an audio subsystem for preventing unauthorized access to audio data according to an exemplary aspect. As shown, this system of two subsystems: the above-described audio subsystem, illustrated in FIG. 2, and integrated in said audio subsystem a subsystem for control of access to the microphone data. According to an exemplary aspect, the audio subsystem disclosed herein includes an audio stream control module 301, with which processes interact via API functions for the creation and control of audio streams, which in one exemplary aspect can be the Windows Audio Service 201. In addition, an audio streams mixing and processing module 302 is provided that is designed to mix audio streams between applications and audio endpoint devices, and also to process audio streams with the help of filters, which in one exemplary aspect can be the protected process Windows Audio Device Graph Isolation 202. Moreover, an audio endpoint devices control module 306 is provided for carrying out the adding and keeping track of audio endpoint devices, which in one exemplary aspect can be the Windows Audio Endpoint Builder service 204.

The subsystem for control of access to microphone data includes the following three components: a RPC traffic filtration module 310, an audio streams blocking module 311 and an access authorization module 312. The RPC traffic filtration module 310 is designed to perform a monitoring of RPC traffic between the audio stream control module 301 and the audio streams mixing and processing module 302, in order to detect RPC requests for creation of audio streams related to an audio endpoint device which is the microphone, and to determine the process identifiers (PID) for which the creation of audio streams is being requested. This system makes it possible to solve the aforementioned problem of identification of processes 300 receiving audio data from the microphone 305, in that all the audio streams circulating between the processes 300 and the microphone 305 are the context of a single protected process "audiodg.exe" (the audio streams mixing and processing module 302).

The audio streams blocking module 311 is installed for each new audio stream from the audio session related to the audio endpoint device which is the microphone 305, as a local effects audio processing object LFX APO 211 inside the audio streams mixing and processing module 302. In one exemplary aspect, the audio streams blocking module 311 is in the form of a driver, such as a WaveRT miniport driver. The audio subsystem automatically installs the audio streams blocking module 311 for each new audio stream within the audio session related to each audio endpoint device from the group of audio endpoint devices 304 for which the audio streams blocking module 311 is registered as a local effects audio processing object LFX APO 211. In one exemplary aspect, the automatic installation of the audio streams blocking module 311 mentioned in the previous sentence is done by the audio streams mixing and processing module 302. After installation, the audio streams blocking module 311 sends a request to the access authorization module 312 to check the authorization of the process in regard to gaining access to the data of the audio stream for which the given audio streams blocking module 311 was installed. To perform the check, the access authorization module 312 receives or requests from the RPC traffic filtration module 310 the process identifier in regard to which said authorization check is being requested. It should be noted that the audio streams blocking module 311 does not possess information as to which process the audio stream for which it has been installed corresponds to. Neither does the RPC traffic filtration module 310 possess such information. The coordination of the request dispatched by the audio streams blocking module 311 with the process identifier obtained by the RPC traffic filtration module 310, which is equivalent to coordinating the audio stream with the process, is done by the access authorization module 312.

According to one aspect, the primary purpose of the audio streams blocking module 311 is to prevent access to the audio stream data by an unauthorized process. For this, the audio streams blocking module 311 performs a zeroing of the data of the audio stream for which the process requesting its creation was found to be unauthorized by the access authorization module 312.

The access authorization module 312 is connected to the RPC traffic filtration module 310 and the audio streams blocking module 311 and is designed to perform a check of the authorization of the processes by the aforementioned process identifiers for access to the data of the audio streams related to the audio endpoint device, such as the microphone 305. The process authorization module can perform both an independent checking of the authorization of the process to obtain access to the data of the audio streams related to the audio endpoint device from the group of audio endpoint devices 304 and also send requests in regard to the process being checked to other security modules. These modules can include a module for control of activity of processes, designed to regulate actions on the part of the processes, such as access to the file system, to the system registry, or interaction with other processes, dividing up all processes into: trusted, not trusted, processes with weak restrictions and processes with strong restrictions. Moreover, an antivirus module can be provided and designed to look for viruses with the help of a database of signatures (descriptions of known viruses and other malicious applications), and to remove or quarantine the corresponding objects and the data related to them. Furthermore, a threat neutralization module may be provided and used for detecting unwanted content, discovering attacks or threats in real time, taking steps to close down any suspicious processes, block Internet traffic, and also restore the system to its last known safe condition. Furthermore, a user feedback module may be provided, making it possible to alert the user as to all attempts by processes to gain access to the microphone data, so that the user can choose to allow a given process access to the microphone or not, and also to provide the user with the option of blocking access to the microphone by default for all processes.

Thus, the access authorization module 312 can identify a process as unauthorized on the basis of verdicts from outside security modules. For example, a process may be identified as unauthorized if the process is malicious or if the process is not authorized by the user to access the microphone data.

In one exemplary aspect, the access authorization module 312 is connected to the audio endpoint devices control module 306 to follow the adding of a new audio endpoint device to the group of audio endpoint devices 304. For each new audio endpoint device, the access authorization module 312 performs a registration of the audio streams blocking module 311, registered as the local effects audio processing object LFX APO 211. In another exemplary aspect, the access authorization module 312 protects against changing and removal of all records of the system registry in which the audio streams blocking module 311 is listed as the local effects audio processing object LFX APO 211.

Figure 4:
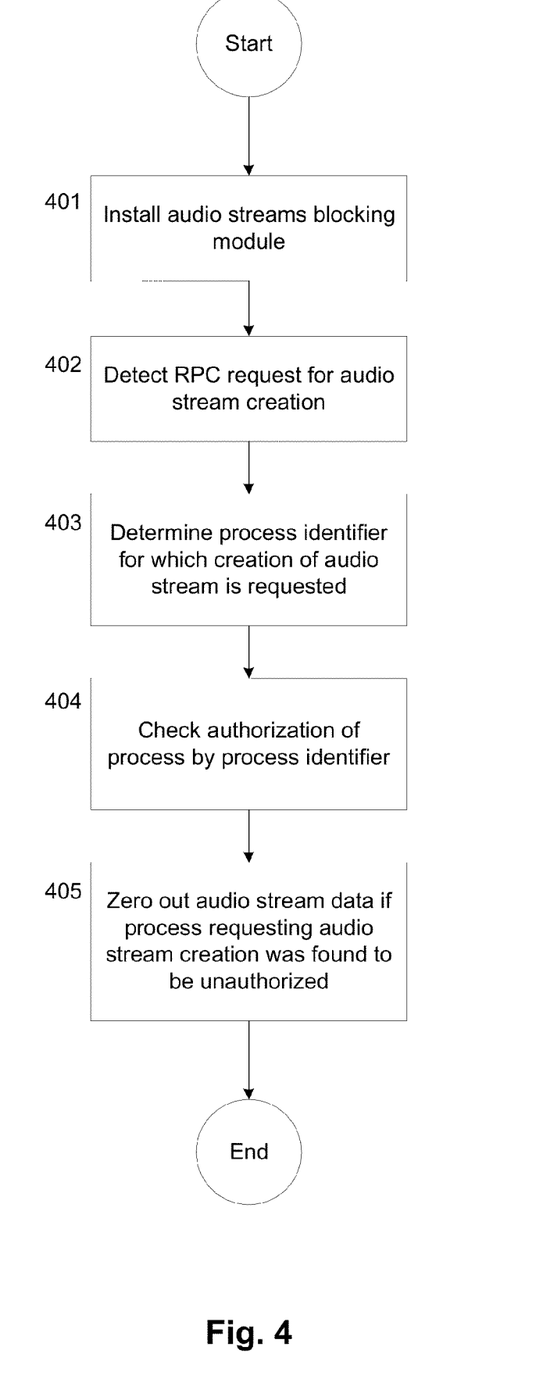
FIG. 4 illustrates a flowchart for method of preventing unauthorized access to audio data according to an exemplary aspect.

FIG. 4 illustrates a flowchart for method of preventing unauthorized access to audio data according to an exemplary aspect. As shown, in step 401 with the aid of the access authorization module 312 the installation of the audio streams blocking module 311 as the local effects audio processing module LFX APO is performed inside the audio streams mixing and processing module 302 for each audio endpoint device which is a microphone 305, accounted for by the audio endpoint devices control module 306. The local effects audio processing module LFX APO is used as the audio streams mixing and processing module 302 for each new audio stream relating to each audio endpoint device which is a microphone 305 for which the given local effects audio processing module LFX APO has been installed.

Next, in step 402, with the help of the RPC traffic filtration module 310, RPC traffic between the audio stream control module 301 and the audio streams mixing and processing module 302 is monitored, an RPC request is discovered for creation of an audio stream relating to the audio endpoint device which is the microphone 305, and the process identifier is determined for which the creation of the aforementioned audio stream is being requested.

During the creation of the new audio stream, the audio streams mixing and processing module 302 applies to it the local effects processing module of audio streams LFX APO which were installed for the audio endpoint device related to the new audio stream. Since in step 401 there was installed for each audio endpoint device which is a microphone an audio streams blocking module 311 as the local effects processing module of audio streams LFX APO, there will be applied to the new audio stream related to the audio endpoint device which is a microphone, in step 403, the audio streams blocking module 311, which will send an authorization request to the access authorization module 312 immediately after initialization.

In response to this request, in step 404, the access authorization module 312 will use the identifier of the process requesting the creation of the audio stream, received in step 402, to check the authorization of the process to gain access to the data of the mentioned audio stream.

And based on the results of the check in step 405, the audio streams blocking module 311 zeroes the data of the mentioned audio stream if the process requesting the creation of the mentioned audio stream was found to be unauthorized with the aid of the access authorization module 312.

The system and method of preventing unauthorized access to microphone data makes it possible to protect the user against audio data leaks occurring as a result of an unauthorized access on the part of processes to the microphone data with the use of mechanisms provided by the audio subsystem within the operating system. However, the aforementioned system and method do not afford protection to the user against audio data leaks occurring as a result of unauthorized access by outside processes to the audio streams arriving at authorized processes. For the protection of audio streams against unauthorized access in the context of the present disclosure, a system and method are realized for a protected transmission of audio data from the microphone to the processes.

Figure 5:
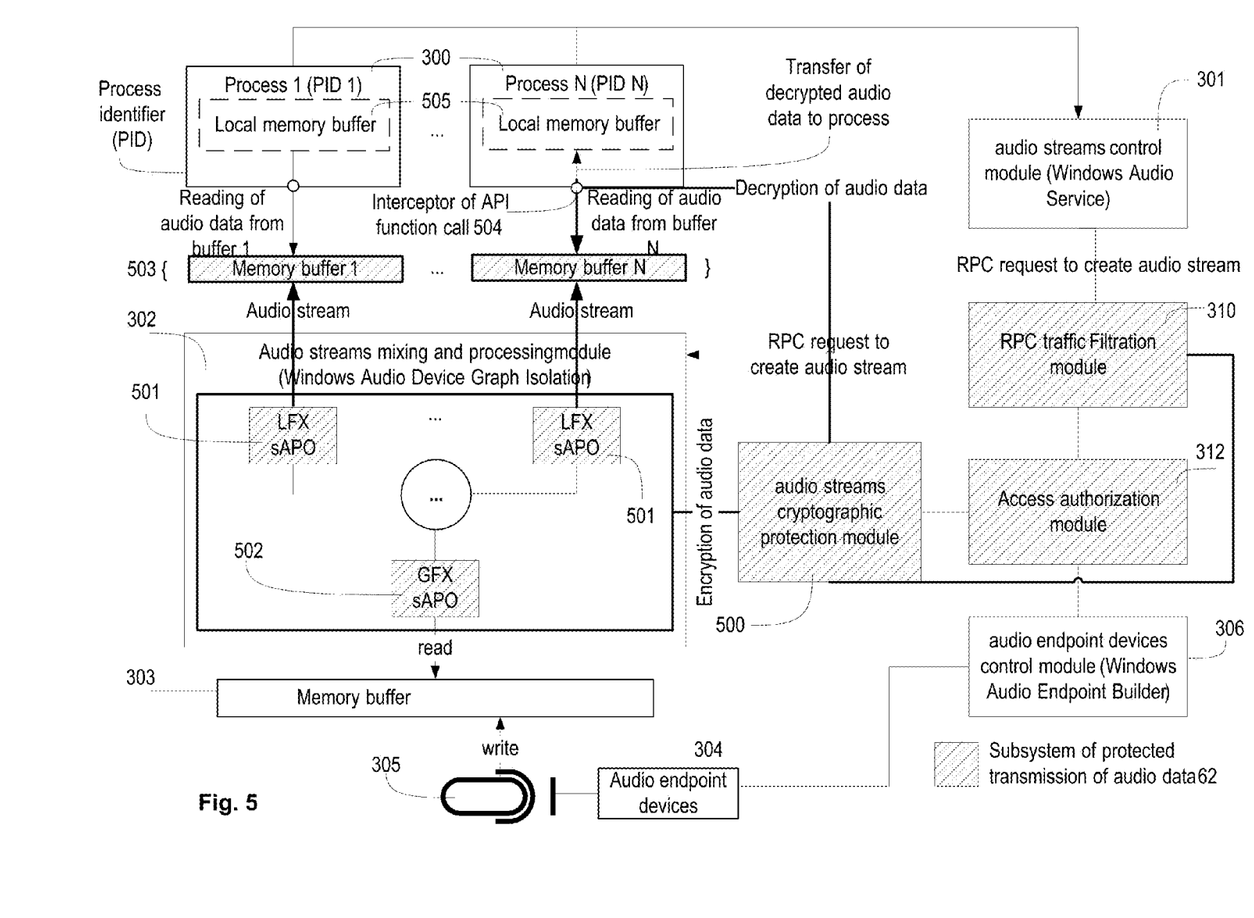
FIG. 5 illustrates another block diagram of an audio subsystem for preventing unauthorized access to audio data according to an exemplary aspect.

FIG. 5 illustrates another block diagram of an audio subsystem for preventing unauthorized access to audio data according to an exemplary aspect. As shown, the system includes two subsystems: the above-described audio subsystem, depicted in FIG. 2, and integrated with it a subsystem for protected transmission of audio data 62. As shown, the audio subsystem includes the audio stream control module 301, an audio streams mixing and processing module 302 and an audio endpoint devices control module 306.

The audio stream control module 301 is designed to create and control audio streams. The processes 300 interact with the audio stream control module 301 with the aid of API functions. In one exemplary aspect, the audio stream control module 301 can be the Windows Audio Service 201.

The audio streams mixing and processing module 302 is connected to the audio stream control module 301 and designed to route the audio streams between the processes 300 and an audio endpoint device from a group of audio endpoint devices 304, such as the microphone 305. The audio streams mixing and processing module 302 is also designed for processing of audio streams with the help of audio processing module supported by the system (Audio Processing Objects, APO). In the Windows audio subsystem, one distinguishes the system audio processing module, which are designated by the abbreviation APO, and third-party audio processing module sAPO. For the purposes of the present disclosure, only sAPO shall be used, being called hereinafter simply audio processing module sAPO. As mentioned above, one distinguishes two types of audio processing objects sAPO which are used by the audio streams mixing and processing module 302: global effects GFX sAPO 502 and local effects LFX sAPO 501. Within an audio session, including audio data capture streams, the global effects audio processing objects GFX sAPO 502 are applied to the incoming audio stream received from the microphone 305. Then, for each process, such as the process N, having requested the audio stream control module 301 to create an audio stream, the audio streams mixing and processing module 302 creates an independent audio stream by copying the incoming stream which was processed with the aid of the global effects audio processing object GFX sAPO 502. Each independent audio stream corresponds to one of the processes 300 and is processed with the help of the local effects audio processing objects LFX sAPO 501. The audio streams mixing and processing module 302 transmits the audio data from the audio endpoint device, such as the microphone 305, to the processes 300 by separate buffers 503, into which the audio streams mixing and processing module 302 writes the audio data, and the processes 300 with the help of a call for an API function read this data. In one exemplary aspect, the audio streams mixing and processing module 302 can be the protected process Windows Audio Device Graph Isolation 202.

The audio endpoint devices control module 306 performs the adding and keeping track of audio endpoint devices. In one exemplary aspect, the audio endpoint devices control module 306 can be the Windows Audio Endpoint Builder service 204.

The subsystem for protected transmission of audio data 62 may include an RPC traffic filtration module 310 and an audio streams cryptographic protection module 500, and it may additionally contain an access authorization module 312. The RPC traffic filtration module 310 carries out a monitoring of RPC traffic between the audio stream control module 301 and the audio streams mixing and processing module 302. The RPC traffic filtration module 310 is designed to detect RPC requests for creation of audio streams related to an audio endpoint device, such as the microphone 305. The RPC traffic filtration module 310 is connected to the audio streams cryptographic protection module 500 and is used within the subsystem for protected transmission of audio data 62 in order to track all RPC requests for creation of audio streams related to any audio endpoint device which is a microphone. The RPC traffic filtration module 310 determines the process identifiers (PID) and stores a set of identifiers {PID 1, . . . , PID N} corresponding to a set of processes 300 {process 1, . . . , process N} for which the creation of audio streams related to an audio endpoint device, such as the microphone 305, is being requested. Thus, the RPC traffic filtration module 310 allows the subsystem of protected transmission of audio data 62 to identify all processes 300 which at the current moment have access to any audio endpoint device which is a microphone.

The audio streams cryptographic protection module 500 is connected to the RPC traffic filtration module 310 and designed to encrypt and decrypt the audio data within the audio streams mixing and processing module 302. For the encrypting of audio data, the audio streams cryptographic protection module 500 uses audio processing module sAPO realized in the form of drivers, which are installed in the operating system and registered in relation to each specific audio endpoint device which is a microphone from the group of audio endpoint devices 304 by adding the corresponding records to the system registry. After installation, the global effects audio processing objects GFX sAPO 502 are automatically applied by the audio streams mixing and processing module 302 to the incoming audio stream obtained via the memory buffer 303 from the audio endpoint device which is a microphone, while the local effects audio processing objects LFX sAPO 501 are used for the processing of each new audio stream related to the same audio endpoint device which is a microphone for which said local effects and global effects audio processing objects LFX sAPO 501 and GFX sAPO 502 have been installed. The encryption algorithm can be partly or wholly realized within the audio processing module sAPO such that the encryption can be done independently by the local effects audio processing object LFX sAPO 501 or by the global effects audio processing object GFX sAPO 502, or so that the encryption is done by a combination of local effects and global effects audio processing objects LFX sAPO 501 and GFX sAPO 502. As the encryption algorithms, one can employ both symmetrical encryption algorithms such as AES, DES, GOST 28147-89, and asymmetrical encryption algorithms such as RSA, El-Gamal. Symmetrical encryption calls for the use of an identical key for both encryption and decryption. Asymmetrical encryption calls for the use of a pair of keys, public and private. The public key is transmitted by a public communications channel (not hidden) and is used for encryption of the data. For the decryption of the data, the second, private key is used. The audio streams cryptographic protection module 500 generates the keys, stores them and transmits the keys to the audio processing module sAPO for encryption.

The data encrypted with the aid of the audio streams cryptographic protection module 500 arrives in the memory buffers 503. Each memory buffer from a group of memory buffers 503 {memory buffer 1, . . . , memory buffer N} corresponds to a process from a group of processes 300 {process 1, . . . , process N}, which at the current moment have access to the audio endpoint device which is a microphone. The memory buffers are created by the audio stream control module 301 for each process requesting the creation of an audio stream. With the aid of the memory buffers 503, the audio streams mixing and processing module 302 transmits to the processes the audio data arriving from the audio endpoint device which is a microphone. It is in fact the memory buffers 503 which are the most likely location of audio data leaks on its path from the audio endpoint device, which is a microphone, to the processes 300. To obtain audio data from the memory buffers 503, the processes 300 use API functions, especially WASAPI functions, by which the processes 300 read the audio data from the memory buffers 503, moving the read audio data to the local memory buffers 505, for example, for its later processing and use. To accomplish the decryption of the audio data, the audio streams cryptographic protection module 500 installs interceptors of the call of that API function by which the processes 300 read audio data from the memory buffers 503. These interceptors are installed by the audio streams cryptographic protection module 500 only for those processes whose identifiers have been determined by the RPC traffic filtration module 310. For example, according to FIG. 5, for the process N having the identifier PID N there is installed an interceptor of the call of the API function 504.

The technology for intercepting calls of API functions is known from conventional systems and method and involves various approaches which can be employed in the context of the present disclosure. According to one of the approaches, based on the fact that the calls of any given API functions in the process N from third-party DLLs are executed through a function import table. This table is filled out when loading the DLL into the process N, and there are written therein the addresses of all functions being imported which may be needed by the process N, including the API function by which the process N reads the audio data from the memory buffer N. Accordingly, to install the interceptor of the call of the API function 504 the audio streams cryptographic protection module 500 finds the import table, and in it the API function whose call needs to be intercepted, and places in the found import table a pointer to another function instead of the original API function. The other function whose pointer has been placed in the import table instead of the original API function is a modified original API function allowing the process N to read the audio data from the memory buffer N, being distinguished in that it additionally contains a call for the routine of decryption of the audio data being read, to be executed by the audio streams cryptographic protection module 500. After completion of this routine, the decrypted audio data are transmitted to the process N.

In one exemplary aspect, the decryption of the audio data located for example in memory buffer N can be done without an interceptor. The process N can independently interact with the subsystem for protected transmission of audio data 62 by special program interfaces, such as KL API (Kaspersky Lab Application Programming Interfaces), which are provided in the form of a Software Development Kit (SDK). Thus, the process N can not only independently call for the decryption routine to be carried out by the audio streams cryptographic protection module 500, but also interact with the audio streams cryptographic protection module 500 for the calling of routines to encrypt the audio data and routines to generate and exchange the keys used for the encryption and decryption of the audio data, and also interact with other components of the subsystem for protected transmission of audio data 62 to ensure the security of the audio data arriving from the audio endpoint device, being a microphone, at the process N.

The access authorization module 312 within the subsystem of protected transmission of audio data 62 is connected to the cryptographic protection module 500 and the RPC traffic filtration module 310 and is designed to check the authorization of the processes by the process identifiers, as determined by the RPC traffic filtration module 310, for granting access to the audio endpoint device which is a microphone. Thus, with the use of the access authorization module 312 in one exemplary aspect the audio streams cryptographic protection module 500 can establish interceptors of a call for the API function only for those processes which have been identified as a result of the aforementioned verification by the access authorization module 312 as being authorized to gain access to the audio endpoint device which is a microphone. As a result of this, encrypted audio data will go to unauthorized processes from the audio streams mixing and processing module 302.

Figure 6:
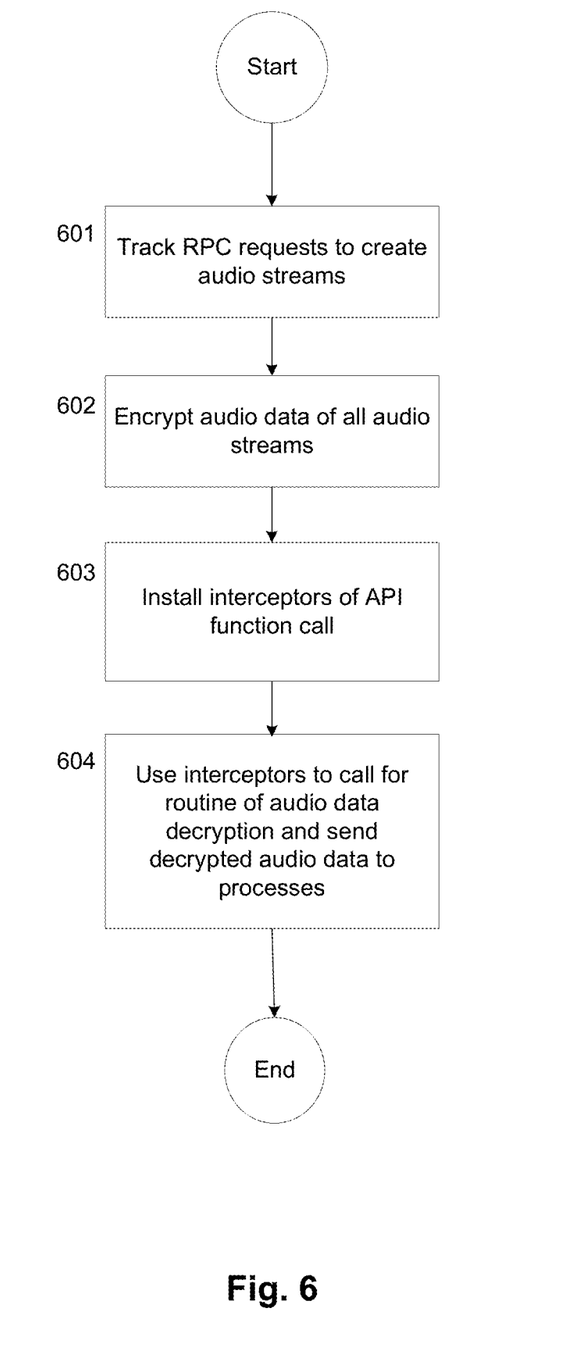
FIG. 6 illustrates a flowchart for method of protected transmission of audio data from a microphone to processes according to an exemplary aspect.

FIG. 6 illustrates a flowchart for method of protected transmission of audio data from a microphone to processes according to an exemplary aspect. According to this flowchart, in step 601 the RPC traffic filtration module 310, designed to monitor the RPC traffic between the audio stream control module 301 and the audio streams mixing and processing module 302, tracks the RPC requests for creation of audio streams related to each audio endpoint device which is a microphone, in order to determine the identifiers of all the processes gaining access to said microphone.

Next, in step 602, the audio data of all the audio streams within the audio streams mixing and processing module 302 is encrypted by the audio streams cryptographic protection module 500. For the encryption of the audio data, the audio streams cryptographic protection module 500 uses audio processing module (APO) which are subdivided into two types of objects: global effects audio processing module GFX sAPO 502 and local effects audio processing module LFX sAPO 501.

The audio streams mixing and processing module 302 places the encrypted audio data into memory buffers 503. Each memory buffer from a group of memory buffers 503 {memory buffer 1, . . . , memory buffer N} corresponds to a process from a group of processes 300 {process 1, . . . , process N}, which at the current moment have access to the audio endpoint device which is a microphone.

For the decryption of the audio data, the cryptographic protection module 500 in step 603 installs interceptors of the call for the API function by which the processes 300 read the audio data from the corresponding memory buffers 503 which are used by the audio streams mixing and processing module 302 for the transmission of audio data from the audio endpoint device which is a microphone to the processes 300. The installing of interceptors by the cryptographic protection module 500 is done for those processes 300 whose identifiers were determined by the RPC traffic filtration module in step 601.

In one exemplary aspect, the audio streams cryptographic protection module 500 installs interceptors of the call for the API function only for those processes of the group of processes 300 which have been identified as a result of the checking by the access authorization module 312 as authorized to have access to the audio endpoint device which is a microphone. The access authorization module 312 performs the checking of the authorization of the processes 300 for access to the audio endpoint device which is a microphone according to their identifiers which were determined by the RPC traffic filtration module 310.

And in step 604 the aforementioned interceptors are used to call for a routine of decryption of audio data, which is executed by the audio streams cryptographic protection module 500, after which the decrypted audio data is transmitted to the processes.

Figure 7:
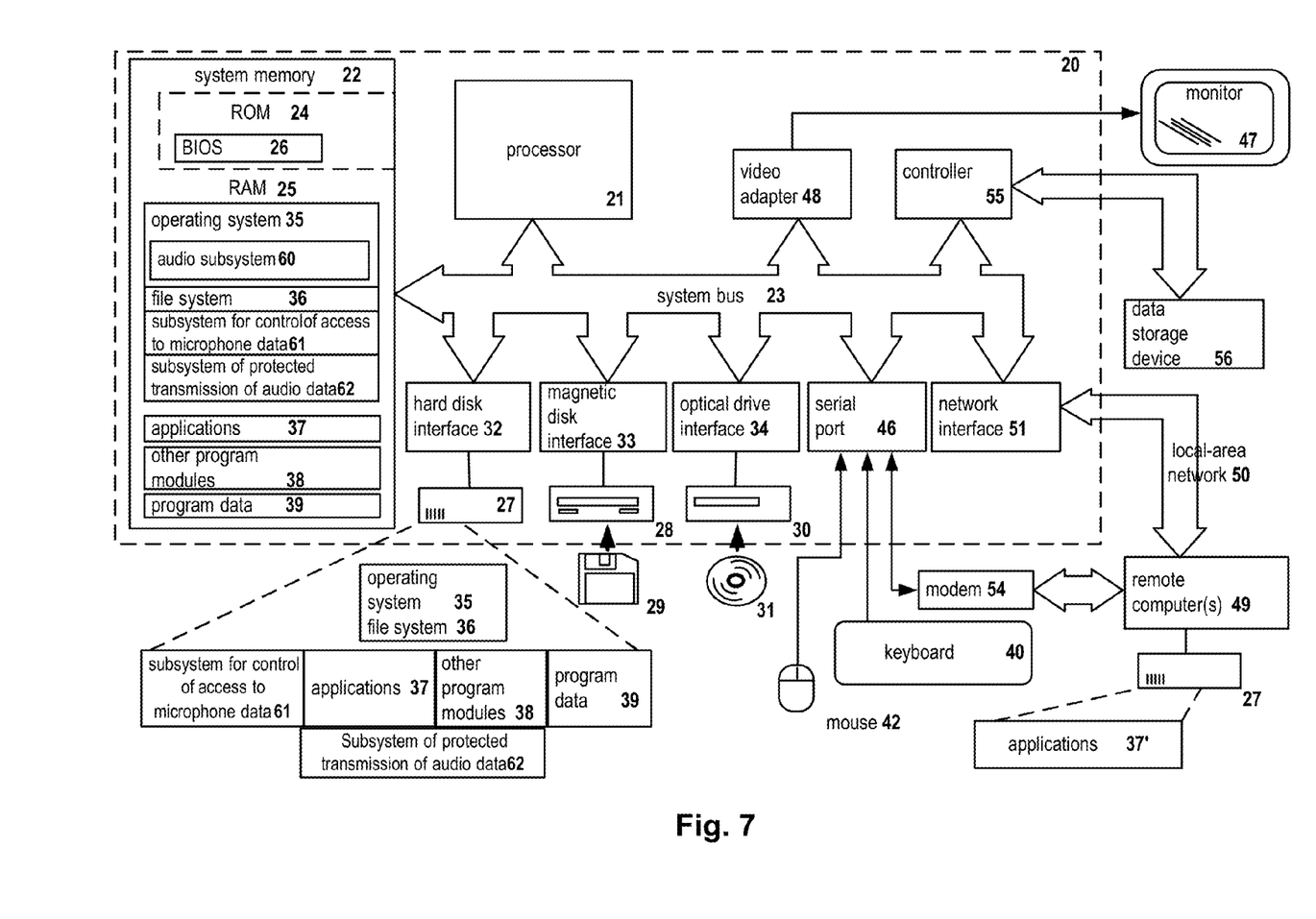
FIG. 7 illustrates an example of a general-purpose computer system on which the disclosed systems and method can be implemented.

FIG. 7 illustrates an example of a general-purpose computer system (which may be a personal computer or a server) on which the disclosed systems (including one or more of the modules) and the method can be implemented according to an example aspect. As shown, the computer system 20 may include a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, which in turn contains audio subsystem 60, depicted in FIG. 2, as well as subsystem for control of access to microphone data 61, depicted in FIG. 3, as well as the subsystem for protected transmission of audio data 62, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 7. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

As noted above, in various aspects, the systems and methods described in the present disclosure in terms of modules. It is reiterates that the term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 7 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing unauthorized access to audio data, the method comprising:
   receiving, by a processor of a computer, a request from one software process selected from a plurality of software processes to obtain an audio stream from an audio endpoint device;
   determining, by the processor, a process identifier for the one software process that transmitted the request to obtain the audio stream;
   allocating, by the processor, a data buffer selected from a plurality of data buffers for the one software process according to the determined process identifier;
   processing and encrypting audio data received from the audio endpoint device by at least one audio processing object, wherein the audio data is associated with the requested audio stream;
   storing, by the processor, the encrypted audio data in the allocated data buffer for the one software process;
   based on the determined process identifier, installing an interceptor of an application program interface (API) function call for the one software process corresponding to the determined process identifier, such that the installed interceptor is configured to access the encrypted audio data from the allocated data buffer and decrypt the encrypted audio data only for the one software process; and
   decrypting the encrypted audio data from the allocated data buffer by the one software process using the interceptor of the API function call.

2. The method according to claim 1, further comprising:
   receiving, by the processor of the computer, a plurality of requests from the plurality of software processes, respectively, to obtain audio streams from one or more audio endpoint devices including the audio endpoint device;
   allocating, by the processor, the plurality of data buffers for the plurality of software processes;
   encrypting audio data associated with each of the requested audio streams;
   storing the encrypted audio data for each of the requested audio streams in the allocated data buffer, respectively; and
   decrypting the encrypted audio data for each of the requested audio streams by at least a portion of the plurality of software processes that have been configured with a respective interceptor of an API function call.

3. The method according to claim 1, further comprising:
   installing the interceptor of the API function call for the one software process only if the processor determines that the one software process is not an unauthorized software process.

4. The method according to claim 3, wherein the determining of whether the software process requesting to obtain the audio stream is an unauthorized software process comprises at least one of:
   monitoring activities of the requesting process to determine whether the process is trusted or not trusted;
   scanning the requesting process by accessing a database of signatures of known viruses and comparing a signature of the requesting process; and
   receiving, from a user, a command whether to grant access to the audio stream by the requesting process.

5. The method according to claim 3, further comprising:
   directly storing the audio data received from the audio endpoint device in a separate data buffer; and
   only granting access to the audio data by the one software process after the audio data has been encrypted and the process identifier data indicates the one software process is not an unauthorized software process.

6. The method according to claim 1, wherein the processing of the audio data device by the at least one audio processing object comprises processing the audio data by a global effects audio processing object allocated for the plurality of software processes and a local effects audio processing object associated with the one software process.

7. The method according to claim 1, wherein the encrypting of the audio data comprises encrypting the audio data by one of a symmetrical encryption algorithm and an asymmetrical encryption algorithm.

8. A system for preventing unauthorized access to audio data, the system comprising:
   a plurality of data buffers in an electronic memory; and
   a processor configured to:
      receive a request from one software process selected from a plurality of software processes to obtain an audio stream from an audio endpoint device;
      determine a process identifier for the one software process that transmitted the request to obtain the audio stream;
      allocate a data buffer selected from the plurality of data buffers for the one software process according to the determined process identifier;
      process and encrypt audio data received from the audio endpoint device by at least one audio processing object, wherein the audio data is associated with the requested audio stream;
      store the encrypted audio data in the allocated data buffer for the one software process;
      based on the determined process identifier, install an interceptor of an application program interface (API) function call for the one software process corresponding to the determined process identifier, such that the installed interceptor is configured to access the encrypted audio data from the allocated data buffer and decrypt the encrypted audio data only for the one software process; and
      decrypt the encrypted audio data from the allocated data buffer by the one software process using the interceptor of the API function call.

9. The system according to claim 8, wherein the processor is further configured to:
   receive a plurality of requests from the plurality of software processes, respectively, to obtain audio streams from one or more audio endpoint devices including the audio endpoint device;
   allocate the plurality of data buffers for the plurality of software processes;
   encrypt audio data associated with each of the requested audio streams;
   store the encrypted audio data for each of the requested audio streams in the allocated data buffer, respectively; and
   decrypt the encrypted audio data for each of the requested audio streams by at least a portion of the plurality of software processes that have been configured with a respective interceptor of an API function call.

10. The system according to claim 8, wherein the processor is further configured to:
   determine whether the one software process requesting to obtain the audio stream is an unauthorized software process based on the process identifier data; and
   install the interceptor of the API function call for the one software process only if the processor determines that the one software process is not an unauthorized software process.

11. The system according to claim 10, wherein the processor is further configured to determine whether the software process requesting to obtain the audio stream is an unauthorized software process by performing at least one of:
   monitoring activities of the requesting process to determine whether the process is trusted or not trusted;
   scanning the requesting process by accessing a database of signatures of known viruses and comparing a signature of the requesting process; and
   receiving, from a user, a command whether to grant access to the audio stream by the requesting process.

12. The system according to claim 10, wherein the processor is further configured to:
   directly store the audio data received from the audio endpoint device in a separate data buffer; and
   only grant access to the audio data by the one software process after the audio data has been encrypted and the process identifier data indicates the one software process is not an unauthorized software process.

13. The system according to claim 8, wherein the processor is further configured to process the audio data device by the at least one audio processing object by first processing the audio data by a global effects audio processing object allocated for the plurality of software processes and then processing the audio data by a local effects audio processing object associated with the one software process.

14. The system according to claim 8, wherein the processor is further configured to encrypt the audio data by one of a symmetrical encryption algorithm and an asymmetrical encryption algorithm.

15. A non-transitory computer readable medium storing computer executable instructions for preventing unauthorized access to audio data, including instructions for:
   receiving a request from one software process of a plurality of software processes to obtain an audio stream from an audio endpoint device;
   determining a process identifier for the one software process that transmitted the request to obtain the audio stream;
   allocating a data buffer of a plurality of data buffers for the one software process according to the determined process identifier;
   processing and encrypting audio data received from the audio endpoint device by at least one audio processing object, wherein the audio data associated with the requested audio stream;
   storing the encrypted audio data in the allocated data buffer for the one software process;
   based on the determined process identifier, installing an interceptor of an application program interface (API) function call for the one software process corresponding to the determined process identifier, such that the installed interceptor is configured to access the encrypted audio data from the allocated data buffer and decrypt the encrypted audio data only for the one software process; and
   decrypting the encrypted audio data from the allocated data buffer by the one software process using the interceptor of the API function call.

16. The non-transitory computer readable medium of claim 15, further comprising instructions for:
   receiving a plurality of requests from the plurality of software processes, respectively, to obtain audio streams from one or more audio endpoint devices including the audio endpoint device;
   allocating the plurality of data buffers for the plurality of software processes;
   encrypting audio data associated with each of the requested audio streams;
   storing the encrypted audio data for each of the requested audio streams in the allocated data buffer, respectively; and
   decrypting the encrypted audio data for each of the requested audio streams by at least a portion of the plurality of software processes that have been configured with a respective interceptor of a API function call.

17. The non-transitory computer readable medium of claim 15, further comprising instructions for:
   determining whether the one software process requesting to obtain the audio stream is an unauthorized software process based on the process identifier data; and
   installing the interceptor of the API function call for the one software process only if the processor determines that the one software process is not an unauthorized software process.

18. The non-transitory computer readable medium of claim 17, wherein the instructions for determining whether the software process requesting to obtain the audio stream is an unauthorized software process comprises at least one of:
   monitoring activities of the requesting process to determine whether the process is trusted or not trusted;
   scanning the requesting process by accessing a database of signatures of known viruses and comparing a signature of the requesting process; and
   receiving, from a user, a command whether to grant access to the audio stream by the requesting process.

19. The non-transitory computer readable medium of claim 17, further comprising instructions for:
   directly storing the audio data received from the audio endpoint device in a separate data buffer; and
   only granting access to the audio data by the one software process after the audio data has been encrypted and the process identifier data indicates the one software process is not an unauthorized software process.

20. The non-transitory computer readable medium of claim 17, wherein the instructions for processing the audio data device by the at least one audio processing object comprises processing the audio data by a global effects audio processing object allocated for the plurality of software processes and a local effects audio processing object associated with the one software process.

21. The non-transitory computer readable medium of claim 17, wherein the instructions for encrypting the audio data comprises encrypting the audio data by one of a symmetrical encryption algorithm and an asymmetrical encryption algorithm.

* * * * *